Patented May 5, 1953

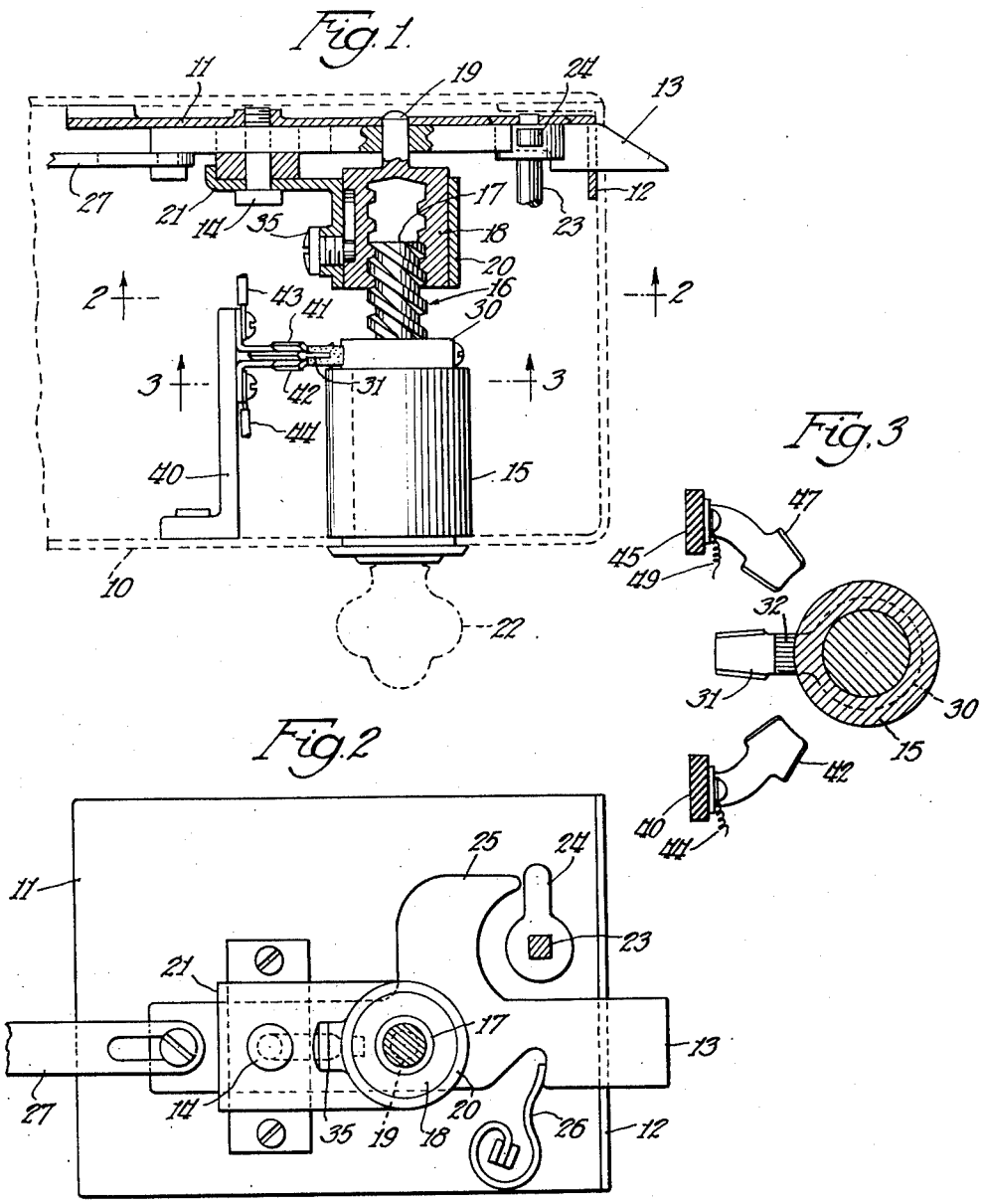

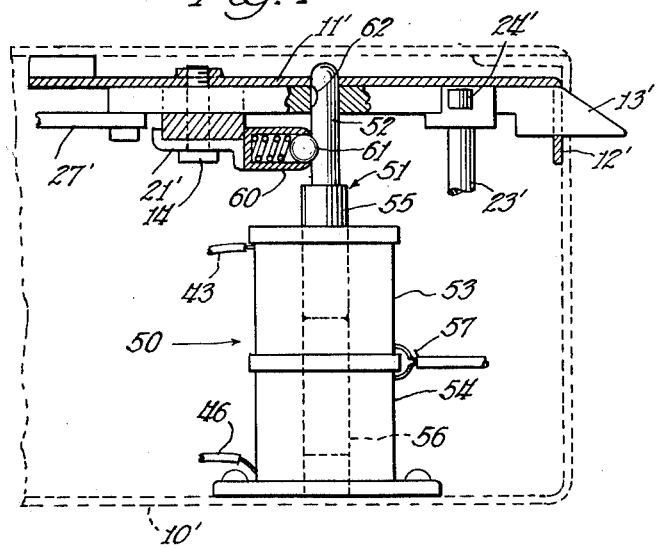
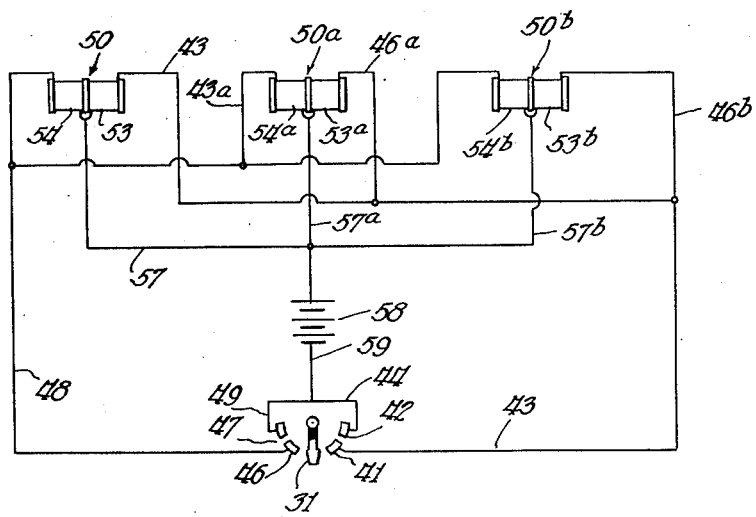

2,637,196

UNITED STATES PATENT OFFICE 2,637,196

LOCK SYSTEM FOR AUTOMOBILES

Fred Harmon Seaver, Jackson, Miss., and
Robert J. Britt, Delavan, Wis.

Application February 3, 1950, Serial No. 142,198

2 Claims. (Cl. 70—264)

This invention relates to an improved lock system for automobiles and the like, and to an improved electrically operated lock construction.

It is an object of this invention to provide a lock system comprising a mechanically operated master lock, and one or more electrically operated secondary locks. Thus, the operator, by locking or unlocking one door of an automobile, will automatically lock or unlock all of the others.

Another object of this invention is to provide an improved electric lock system which is relatively simple in operation, and which may be easily installed in an automobile provided with the conventional mechanical locks.

A further object of this invention is to provide an improved electrically operated lock which imposes no drain on the battery of an automobile during such time as the lock is maintained in either operative or inoperative position.

Still another object is to provide an improved electrically operated lock of small dimensions so that it may be installed in a relatively confined space available in an automobile door.

A still further object is to provide an improved solenoid construction which is particularly adapted for use in automobile door locks.

Other objects, features and advantages of this invention will become apparent as the description proceeds.

With reference now to the drawings, in which like reference numerals refer to like parts—

Fig. 1 is a plan section of a mechanically operated master lock, constructed according to this invention;

Fig. 2 is a vertical section taken along line 2—2 of Fig. 1;

Fig. 3 is a section taken along line 3—3 of Fig. 1, showing the electric contacts;

Fig. 4 is a plan section of an electrically operated secondary lock constructed according to this invention; and Fig. 5 is a circuit diagram of the lock system as a whole, including one mechanical lock and three electrically operated locks.

With reference to Fig. 1, the reference numeral 10 designates generally the outline of an automobile door, in which door is mounted by suitable means a base plate 11 having a turned-up edge 12. A bolt 13 is suitably mounted on said plate by means of one or more pins 14, the pins extending through suitable slots in the bolt and being threaded into the base plate 11. The bolt 13 projects through an aperture in the turned up edge 12, and is adapted to engage the usual cooperating member, not shown, which is mounted in the door frame.

Also mounted in the door 10, is a tumbler lock 15, from which projects a spindle 16 which carries threads 17. The spindle cooperates with a special nut 18 which carries a locking pin 19, by means of which the bolt 13 may be locked to base plate 11, thereby maintaining the bolt 13 in projected position.

The nut 18 is mounted for axial displacement in a sleeve 20 which is provided with a bracket 21 by means of which the sleeve may be mounted with respect to the other parts of the door. In the embodiment shown, the bracket 21 is mounted on the pin 14.

It will be observed that the threads 17 have a large lead so that when a key 22 is inserted into the tumbler lock 15, a single revolution of the key will be sufficient to retract or project the nut and locking pin from or into locking position. The nut 18 is locked against rotation in the sleeve 20 by means of a dog point screw 35 which extends through the sleeve 20 and engages a groove 36 in the nut.

When the lock pin 19 is in retracted or unlocked position, the bolt may be freely operated to permit opening or closing of the door. In this connection, a latch spindle 23 is suitably journaled in the base plate and carries a cam 24 which is adapted to engage a projection 25 on the bolt 13 in order to retract the bolt. A suitable spring 26 engages the bolt to urge it into latched position. The latch spindle 23 is generally actuated by the exterior door handle, not shown herein, and a link 27 extends between the bolt 13 and the interior door handle, not shown, in the usual manner.

The parts thus far described constitute a mechanically operated lock of more or less conventional design.

Mounted on the spindle 16 is a collar 30 which carries a contact bridging member 31. The contact bridging member may be suitably insulated from the collar and other locked parts by means of a Bakelite strip 32.

A bracket 40 is suitably mounted to the door 10 and carries two locking contacts 41 and 42 which are provided with conductors 43 and 44. These locking contacts are spaced from each other and adapted to be bridged by the contact bridging member 31 in order to close the circuit between the conductors 43 and 44, as shown in Fig. 1. Similarly, a bracket 45 carries unlocking contacts 46 and 47, secured to which are conductors 48 and 49. The parts are so arranged that when the key is inserted, the contact bridging member 31 is in the horizontally extended position shown in Fig. 3. If the door is unlocked, the key is turned in the clockwise direction in order to advance the locking pin 19 into locking position. As the key is turned through a complete revolution, first the contact bridging member closes the circuit between unlocking contacts 46 and 47, and then through locking contacts 41 and 42, and then the key is withdrawn and the door remains locked. Thus, as the key is rotated, two impulses are transmitted to the secondaries, as will be hereinafter pointed out, first an unlocking impulse and then a locking impulse. Conversely, to unlock the door the key is inserted and rotated for a complete revolution in the counterclockwise direction with the result that first a locking impulse is transmitted to the secondaries, and then an unlocking impulse.

The construction of the electrically operated secondary lock is shown in Fig. 4, and the parts thereof which are substantially identical to the parts of the mechanically operated master lock are designated by the same reference numerals primed. However, instead of the tumbler lock 15, each secondary lock is provided with a double solenoid 50 which operates a plunger 51 which carries a locking pin 52. This locking pin 52 cooperates with the bolt 13' and the base plate 11' in the same manner as locking pin 19 cooperates with its respective parts. The double solenoid 50 comprises a locking coil 53 and an unlocking coil 54 which are disposed in end to end relationship, and constructed as a single unit. The plunger 51 comprises two parts, a non magnetic member 55 made of a suitable non magnetic material such as brass, and a magnetic member 56, made of a suitable magnetic material, such as steel. Thus, when the locking coil 53 is energized, the plunger 51 and the locking pin 52 will be projected into locking position, as shown in Fig. 4, and when the unlocking coil 54 is energized, the plunger and locking pin will be retracted into unlocking position.

Conductors 43 and 48 extend from the locking and unlocking coils, respectively, to the locking and unlocking contacts 41 and 46, respectively. The opposite ends of each coil are connected to a common conductor 57 which leads to a suitable battery 58, as shown in Fig. 5. From the other end of the battery a common conductor 59 connects with conductors 44 and 49, respectively, each of which conductors are connected to contacts 42 and 47, respectively.

With reference to Fig. 5, it will be observed that as the spindle 16 of the master lock is rotated in the counterclockwise direction, first a locking impulse is transmitted to the secondary, and then an unlocking impulse. The locking impulse may be disregarded, since the locking pin 52 of the secondary is already in locking position, but upon the receipt of an unlocking impulse, the unlocking coil 54 will be momentarily energized and cause retraction of the locking pin 52 into unlocking position. Similarly, when the door is unlocked, insertion of the key and rotating it clockwise will cause the locking pin 52 to be projected to locking position, at the same time that the locking pin 19 of the mechanical lock is projected into locking position.

As shown in Fig. 5, a plurality of secondary locks may be operated from a single master lock by connecting the double solenoids of each secondary lock in parallel with each other. For instance, as applied to an automobile, one front door will be operated by the mechanical lock which includes the spindle 16 and the contacts and contact bridging member, whereas the other front door lock is actuated by double solenoid 50, and the two rear door locks are actuated by double solenoids 50ᵃ and 50ᵇ, respectively.

In order to maintain the locking pin 52 in its locking or unlocking position, respectively, during such times as the double solenoid is not energized, a ball click 60 is carried by a bracket 21'. The ball click cooperates with one or the other of locking notch 61 or unlocking notch 62, which are formed in the locking pin 52. Thus, the locking pin is maintained in its desired position without causing any drain on the battery.

It will be observed that if a car is provided with four mechanical locks of the types shown in Figs. 1 and 2, the locks may be converted to embody the locking system of this invention merely by adding to one lock the contact bridging member 31, and the brackets 40 and 45 with their associated contacts. With respect to the three remaining locks which are to be converted to electrically operated locks, the tumbler locks are removed, and the double solenoids are mounted in their place, with the corresponding substitution of the plunger 51 for the nut 18. Also the bracket 21' carrying the ball click 60 is substituted for the bracket 21 which carries the sleeve 29 and dogpoint screw 35.

Similarly, when an automobile is provided with a somewhat different type of mechanical lock, that automobile can be converted to embody the electric locking system shown and described herein, merely by substituting the parts mentioned above.

Although only a preferred embodiment of this invention has been shown and described herein, it will be understood that various modifications and changes may be made without departing from the spirit of this invention as defined in the appended claims.

We claim:

1. A lock system for automobiles comprising a mechanically operated master lock having a latch bolt, a locking pin for locking said latch bolt which is capable of assuming a locking position and an unlocking position, a rotatable spindle for actuating said locking pin, a contact closing member mounted on said spindle for rotation therewith, a pair of locking contacts and a pair of unlocking contacts, disposed in the path of said contact closing member for cooperation therewith to transmit first a locking impulse and then an unlocking impulse, or vice versa, depending upon the direction in which the spindle is rotated, and a secondary lock comprising a latch bolt, a double solenoid having a locking coil and an unlocking coil disposed in end to end relationship, said locking coil being in circuit with said locking contacts and the unlocking coil being in circuit with said unlocking contacts, a plunger for said solenoid for locking said last mentioned latch bolt and which is responsive to the energization of either said locking coil or said unlocking coil and is adapted to be moved from unlocking position into locking position, or from locking position into unlocking position, depending upon which of said respective coils are energized, and means for maintaining said plunger in either of said locking or unlocking positions after deenergization of said coils.

2. A control system for a plurality of automobile door locks of the type embodying a base plate and a manually actuated bolt slidably mounted on said base plate, said base plate and said bolt having apertures which register when said bolt is in extended position, and a slidably mounted locking pin disposed substantially perpendicular to said base plate and bolt and adapted to be projected into said registering apertures when in locking position, and adapted to be retracted therefrom when in unlocking position, one of said locks constituting a master lock and being provided with a key controlled rotatable spindle mounted in substantial alignment with said locking pin, and screw threaded means for causing projection or retraction of said locking pin when said spindle is rotated by a key, said control system comprising a circuit control arm extending radially from said spindle, and two circuit closing means disposed in the path of said circuit control arm and adapted to be actuated one after the other by the rotation of said arm, another of said locks constituting a secondary lock and being provided with a double solenoid having a locking winding in circuit with one of said circuit closing means, an unlocking winding in circuit with the other of said circuit closing means, and a plunger for said solenoid on which plunger is mounted the locking pin of said secondary lock, whereby said locking pin will be projected into either locking position or retracted into unlocking position by the rotation of said key controlled spindle so as to project the locking pin of said master lock into locking position, or unlocking position, respectively.

FRED HARMON SEAVER.
ROBERT JAMES BRITT.

References Cited in the file of this patent

UNITED STATES PATENTS

| Number | Name | Date |
|---|---|---|
| 1,520,509 | Rancour | Dec. 23, 1924 |
| 2,001,737 | Lakin | May 21, 1935 |
| 2,006,624 | Block | July 2, 1935 |
| 2,031,523 | Braren | Feb. 18, 1936 |
| 2,061,978 | Pintka | Nov. 24, 1936 |
| 2,156,387 | Goldfinger | May 2, 1939 |

FOREIGN PATENTS

| Number | Country | Date |
|---|---|---|
| 404,088 | France | Oct. 9, 1909 |